United States Patent [19]

Sasaki et al.

[11] Patent Number: 4,536,483

[45] Date of Patent: Aug. 20, 1985

[54] PROCESS FOR REGENERATION OF IRON-ANTIMONY METALLIC OXIDE CATALYSTS

[75] Inventors: Yutaka Sasaki; Yutaka Kiyomiya; Toshio Nakamura; Yoshimi Nakamura; Masanori Yamaguchi, all of Kanagawa, Japan

[73] Assignee: Nitto Chemical Industry Co., Ltd., Tokyo, Japan

[21] Appl. No.: 545,713

[22] Filed: Oct. 26, 1983

[30] Foreign Application Priority Data

Oct. 26, 1982 [JP] Japan .................. 57-186745

[51] Int. Cl.³ .............. B01J 27/30; B01J 23/94; C07C 121/32; C07C 120/14
[52] U.S. Cl. .................. 502/20; 260/465.3; 260/465.9; 423/376; 502/41; 502/54; 502/215; 562/471; 562/472; 562/474; 562/477; 585/626; 585/631
[58] Field of Search ........... 502/20, 25, 34, 215, 502/38, 41, 54; 260/465.3; 568/431, 449, 474, 479; 562/545–547; 585/622, 626, 901, 631

[56] References Cited

U.S. PATENT DOCUMENTS

| Re. 30,430 | 11/1980 | Kerr | 562/547 |
| 3,236,782 | 2/1966 | Koch | 568/449 |
| 4,029,636 | 6/1977 | Lowry et al. | 260/465.3 |
| 4,410,450 | 10/1983 | Sasaki et al. | 502/22 |

Primary Examiner—P. E. Konopka
Attorney, Agent, or Firm—Sughrue, Mion, Zinn, Macpeak & Seas

[57] ABSTRACT

Iron-antimony metallic oxide catalysts which have become deactivated after being used for the production of aldehydes, acids, nitriles, or dienes through oxidation, ammoxidation, or oxidative dehydrogenation of organic compounds in fluidized-bed reactors are regenerated by adding to the catalyst a solid molybdenum component which is volatile or capable of forming a volatile compound under reaction conditions. The metallic oxide catalysts contain as essential components (I) Fe, (II) Sb, (III) at least one element selected from the group consisting of V, MO, and W, and (IV) Te.

9 Claims, No Drawings

PROCESS FOR REGENERATION OF IRON-ANTIMONY METALLIC OXIDE CATALYSTS

FIELD OF THE INVENTION

The present invention relates to a process for regenerating iron-antimony metallic oxide catalysts which have become deactivated after being used for oxidation, ammoxidation, or oxidative dehydrogenation of organic compounds in fluidized-bed reactors.

BACKGROUND OF THE INVENTION

It is known that iron-antimony metallic oxide catalysts containing as essential elements (I) iron, (II) antimony, (III) at least one element selected from the group consisting of vanadium, molybdenum, and tungsten, and (IV) tellurium are useful for oxidation, ammoxidation, or oxidative dehydrogenation of organic compounds.

Such catalysts are described in U.S. Pat. Nos. 3,668,147, 3,716,496, 3,988,359, 4,083,804 and 4,370,279, and Japanese Patent Publications Nos. 19766/1972, 19767/1972, and 39839/1979, all of which were issued to the present inventors.

Such catalysts catalyze the oxidation of propylene into acrolein and acrylic acid and the ammoxidation of propylene into acrylonitrile. They also catalyze the oxidation of isobutene and t-butanol into methacrolein and methacrylic acid and the ammoxidation of isobutene and t-butanol into methacrylonitrile.

Moreover, by the use of such catalysts, methanol is oxidized into formaldehyde and ammoxidized into hydrogen cyanide, and n-butene is oxidatively dehydrogenated into butadiene.

These iron-antimony metallic oxide catalysts have good activity and life (duration of selectivity), and exhibit outstanding catalytic performance. Nevertheless, they may become deactivated gradually when used over a long period of time, depending on the specific conditions of reaction. The deactivation may be accelerated by accidents or inappropriate reaction conditions.

There are a variety of causes for deactivation, and remedies for deactivation are being investigated from several aspects. The causes are not yet completely understood and the remedies proposed so far are limited to changing the reaction conditions, replacing the catalyst partially or entirely, and removing the deactivated catalyst from the reactor and regenerating it. Such remedies are time-consuming and costly because they interrupt the reaction. An example of these remedies is described in U.S. Pat. No. 4,208,303.

Any method of recovering the catalytic performance without interruption of the reaction would be very advantageous.

One such method is disclosed in U.S. Pat. No. 3,882,159. According to the disclosure, the deactivated molybdenum-containing catalyst for fluidized-bed reactors used for the ammoxidation of hydrocarbons is regenerated by being contacted with fluidized-bed particles composed of a substantially inactive carrier and molybdenum oxide during the course of the reaction. The regeneration is accomplished by replenishing the catalyst with the molybdenum component, because it is stated that molybdenum is lost from the molybdenum-containing catalyst in the course of reaction and this decreases the catalytic activity.

This process, however, has certain disadvantages. The particles that replenish the deactivated catalyst with the molybdenum component are composed of a molybdenum component and an inert carrier. These particles release the molybdenum component, leaving only the inert carrier. The particles of the inert carrier have a low specific gravity, and mostly escape from the fluidized-bed reactor, but it is very difficult to remove them completely. The unremoved inert carrier particles (e.g., silica particles) accumulate in the fluidized-bed reactor and dilute the catalyst when the regeneration process is repeated, thus causing further problems in maintaining catalytic activity. For this reason, the regeneration process described can be used only for a limited period.

This U.S. patent is concerned only with regeneration of a molybdenum containing fluidized-bed catalyst, wherein molybdenum oxide supported on an inert carrier is used as the regenerating agent. The above-described U.S. patent does not disclose a process for regenerating an iron-antimony metallic oxide catalyst. Furthermore, because it teaches as essential the use of an inert carrier for the replenisher, the process has the disadvantage that unremoved inert carrier particles accumulate in the reactor, diluting the catalyst and reducing catalytic activity.

U.S. Pat. No. 3,236,782 discloses a process for regenerating metallic oxide catalysts, at least a part of which is chromium, vanadium, molybdenum, or tungsten. According to the disclosure, the regeneration process is accomplished by contacting the catalyst with a vapor of the above-listed metal present in the catalyst. This regeneration process is intended to replenish the chromium, vanadium, molybdenum, or tungsten component which has escaped in the course of reaction. This process, however, requires a complex operation to introduce into the reaction system fresh component in the vapor phase.

Further, this U.S. patent does not disclose a process for the regeneration of an iron-antimony metallic oxide catalyst, and only discloses process when used in a fixed-bed reactor.

SUMMARY OF THE INVENTION

This invention overcomes the above-described problems encountered in regenerating iron-antimony metallic oxide catalysts used in the oxidation, ammoxidation, or oxidative dehydrogenation of organic compounds.

An object of this invention is to provide a process for regenerating iron-antimony metallic oxide catalysts which have become deactivated after being used for the production of aldehydes, acids, nitriles, or dienes through oxidation, ammoxidation, or oxidative dehydrogenation of organic compounds in fluidized-bed reactors.

Another object of the invention is to provide a process for restoring the catalyst without increasing its quantity, thus preventing the deterioration of the fluidization due to increased catalyst.

A further object of this invention is to provide a regeneration process that can be carried out in the course of the reaction without interruption of the reaction resulting in economic loss, and a process which does not require additional equipment for introducing the replenisher in the vapor phase.

These objects are achieved by performing the oxidation, ammoxidation or oxidative dehydrogenation reaction in the presence of both a metallic oxide catalyst and a solid molybdenum component which is volatile or capable of forming a volatile compound under reaction conditions. The metallic oxide catalyst contains as essential components (I) Fe, (II) Sb, (III) at least one element selected from the group consisting of V, Mo, and W, and (IV) Te.

DETAILED DESCRIPTION OF THE INVENTION

Catalyst

The catalyst to be regenerated in this invention includes any of the iron-antimony metallic oxide catalysts for fluidized-bed reactors described in the above-mentioned patents, containing as essential components (I) iron, (II) antimony, (III) at least one element selected from the group consisting of vanadium, molybdenum, and tungsten, and (IV) tellurium. These catalysts have the empirical formula $$Fe_{10}Sb_aMe_bTe_cQ_dO_e(SiO_2)_f$$

where
Me is at least one element selected from the group consisting of V, Mo, and W;
Q is at least one element selected from the group consisting of Li, Na, K, Rb, Cs, Be, Mg, Ca, Sr, Ba, Y, La, Ce, Th, U, Ti, Zr, Hf, Nb, Ta, Cr, Mn, Re, Ru, Os, Co, Rh, Ir, Ni, Pd, Pt, Cu, Ag, Zn, Cd, B, Al, Ga, In, Tl, Ge, Sn, Pb, P, As, Bi, S, and Se;
$a = 2$ to $100$ (preferably $10$ to $40$),
$b = 0.01$ to $20$ (preferably $0.1$ to $5$),
$c = 0.05$ to $10$ (preferably $0.25$ to $5$),
$d = 0$ to $20$ (preferably $0.5$ to $6$),
$e = $ a number corresponding to the oxides formed by the above components, and
$f = 0$ to $200$ (preferably $25$ to $150$).

The catalyst may be used in any form. For the best results when used in fluidized-bed reactors, the particle size should be 1 to 500 microns, and preferably 5 to 200 microns. The weight mean diameter (median) of the particles should be 20 to 120 microns. These catalysts may or may not be supported on a carrier such as silica, silica-alumina, alumina, titania, silica-titania, and zirconia.

The preparation of the iron-antimony metallic oxide catlayst to be regenerated in accordance with the process of this invention is not restricted to a specific process. For example, catalysts for fludized-bed reactors may be produced by spray drying and other known methods as disclosed in U.S. Pat. Nos. 3,341,471, 3,657,155 and 3,686,138. In U.S. Pat. No. 3,657,155, the slurry containing a trivalent antimony compound, a polyvalent metal compound, silica sol, a ferric compound and a nitric acid radical is previously prepared, after adjusting the pH of the resulting slurry to 7 or less it is subjected to a heat-treatment while retaining the form of slurry at a temperature of about 40° to 150° C. and then the slurry is finally spray-dried. Thereafter, the composition is calcined at a temperature of about 400° to 1,000° C. for 1 to 50 hours to produce the iron-antimony metallic oxide catalyst.

Solid Molybdenum Component

The solid molybdenum component used in the process of this invention is not unduly limited and may be freely selected from a variety of compounds. It is in the form of particles that can be fluidized under the reaction conditions, because in a preferred embodiment this invention is applied to regenerate the catalyst for a fluidized-bed reactor in the course of the reaction. In addition, the solid molybdenum component should be volatile or capable of forming a volatile compound under the reaction conditions conventionally used in the reaction.

Examples of the solid molybdenum component include metallic molybdenum, molybdenum dioxide, molybdenum trioxide, molybdic acid, ammonium molybdate, ammonium paramolybdate, other molybdates, phosphomolybdic acid, ammonium phosphomolybdate, other phosphomolybdates, heteropoly acids of molybdenum and salts thereof, molybdenum disulfide, molybdenum trisulfide, molybdenum dichloride, molybdenum trichloride, molybdenum pentachloride, other solid molybdenum halides, and organic molybdenum compounds which are solid at ordinary temperature. Preferred compounds include metallic molybdenum, molybdenum trioxide, molybdic acid, ammonium molybdate, ammonium paramolybdate, and ammonium phosphomolybdate.

For best results when mixed with the catalyst, the solid molybdenum component should have approximately the same particle diameter as that of the catalyst. The particle size of the solid molybdenum component is 0.1 to 5000 microns, and preferably 1 to 1000 microns. The weight mean diameter (median) should be preferably 0.5 to 500 microns. Particles of low density should have a large diameter and particles of high density should have a small diameter.

Although the molybdenum component is easy to handle when supported on a carrier, the use of a carrier is not preferred because it remains in the reaction system after the molybdenum component has escaped. In this invention, it is preferred to use a solid molybdenum component that is not supported on a carrier.

Regeneration Process

According to the process of this invention, the regeneration of the catalyst can be accomplished without interrupting the reaction. The solid molybdenum or molybdenum compounds introduced are gradually consumed in the course of the reaction and do not adversely affect the reaction.

The solid molybdenum component of proper particle size is introduced into the reaction in the form of a powder or dry-mixture with the catalyst.

In order for the molybdenum component to be used effectively, it should remain in the reactor for a period of time sufficient for it to transfer to the catalyst. This time period varies depending on the properties and shape of the solid molybdenum component; thus the quantity and rate of addition must be properly adjusted.

The effect of the catalyst regeneration is produced when the molybdenum component has transferred to the catalyst. If the quantity of the molybdenum component is excessively small, the effect is not produced; and if it is excessively great, carbon dioxide and carbon monoxide are formed and the yield decreases.

The solid molybdenum component should be added in such an amount that the apparent content of molybdenum in the catalyst increases by 0.01 to 2 wt%, preferably 0.05 to 1.5 wt%, and most preferably 0.05 to 0.5 wt%. The increase in apparent content of molybdenum is defined as follows:

Increase of apparent molybdenum content (%) =

$$\frac{\text{Weight of molybdenum in solid molybdenum component added (g)}}{\text{Total weight of catalyst (g)}} \times 100 \, (\%)$$

The preferred quantity of the solid molybdenum component to be added varies slightly depending on its properties. In the event that the molybdenum component is rapidly transferred to the depleted catalyst, the molybdenum component is calculated as indicated above. In the event that the molybdenum component is more slowly transferred to the depleted catalyst, the molybdenum component is used in somewhat greater quantity than calculated. The solid molybdenum component may be physically dry-blended with the catalyst before the reaction starts, or it may be added alone or together with the catalyst during the reaction. In the case of a fluidized-bed reaction, it is possible conveniently to add or withdraw the catalyst in the course of reaction as compared with the fixed-bed reaction.

The solid molybdenum component can be handled in the same manner as the fluidized-bed catalyst, and it can be added and mixed in the course of reaction continuously or intermittently by a simple operation.

The solid molybdenum component may be added in several portions according to the state of reaction.

If the yield obtained is not completely restored by the addition of the solid molybdenum component, or if the yield is decreased by excessive addition of the solid molybdenum component, it may be possible to restore the yield by adding the tellurium-containing solid disclosed in U.S. patent application Ser. No. 379,205 filed on May 17, 1982 by the present inventors.

The catalysts involved in the process of this invention are iron-antimony metallic oxide catalysts. Even in the case of catalysts of this kind which contain a small quantity of molybdenum component, the loss of the molybdenum component is not observed in the course of the reaction. Therefore, it is not likely that deactivation takes place due to the escape of molybdenum from the catalyst.

Furthermore, such catalysts do not necessarily contain molybdenum as an essential ingredient, and this class of catalysts cannot become deactivated due to the loss of molybdenum. Nevertheless, their activity is restored when a molybdenum component is added. This surprising result has never been anticipated.

It is theorized that the molybdenum component introduced into the fluidized-bed in the course of the reaction deposits evenly on the catalyst. This is one of the factors which make the process of this invention effective.

It is considered likely that the regeneration involved in this invention takes place according to a mechanism different from that described in the above-mentioned U.S. Pat. Nos. 3,882,159 and 3,236,782.

The mechanism by which the process of this invention produces its effect is not yet elucidated. It is considered probable, however, that the volatile molybdenum component formed under reaction conditions is deposited on the deactivated catalyst, resulting in the formation of new reaction sites. In other words, the process of this invention seemingly performs the regeneration of catalysts; but in essence, it creates new reaction sites on the catalyst.

Regeneration of the depleted catalyst occurs 1 to 5 hours after the addition of the solid molybdenum component. The solid molybdenum component is firmly fixed to the catalyst, and its effect is lasting. The molybdenum component may be added to regenerate a catalyst on several successive occasions as required.

An important restriction in the present process is that the quantity of the molybdenum component added is limited to a given range, and preferred results are not obtained when these limits are exceeded.

According to the process of this invention, the reaction rate can be increased and the yield for the intended product can be restored if the type and quantity of the molybdenum component are properly selected.

The oxidation, ammoxidation, and oxidative dehydrogenation of organic compounds to which the process of this invention can be applied may be performed under any conventional conditions known in the art and are not restricted. That is, the molar ratio of organic compound:oxygen:ammonia is typically 1:0.5–10:0–5; the reaction temperature is typically 350° to 500° C.; and the reaction pressure is typically atmospheric pressure to 2 kg/cm$^2$G. The feed gas may be diluted with nitrogen, steam, carbon dioxide, carbon monoxide, or helium, in any conventional ratio. The linear velocity ranges from the order of cm/sec to the order of m/sec, and is properly selected according to the scale and type of reactor used. In this specification, the yield and contact time are defined as follows:

$$\text{Yield (\%)} = \frac{\text{Weight of carbon in reaction product (g)}}{\text{Weight of carbon in organic compound fed (g)}} \times 100$$

$$\text{Contact time (sec)} = \frac{\text{Volume of filled catalyst (l)*}}{\text{Flow rate of feed gas (l/sec)}}$$

*based on the bulk density of catalyst

The organic compound includes, for example, propylene, isobutene, n-butene, methanol, and t-butanol. These compounds form their corresponding aldehydes, acids, diolefins, and nitriles.

The present invention is illustrated in greater detail by reference to the following examples and comparative examples. However, this invention is not to be construed as being limited to those examples. Unless otherwise indicated herein, all parts, percentages, ratios and the like are by weight.

Catalytic activity was tested under the following conditions.

(1) Ammoxidation of propylene

A catalyst was charged into a fluidized-bed reactor having a catalyst fluidizing section of 2.5 cm inside diameter and 40 cm height, and feed gas of the following composition was introduced:

O$_2$ (air)/propylene=2.2 (mol/mol)

NH$_3$/propylene=1.1 (mol/mol)

The reaction was carried out at atmospheric pressure.

(2) Ammoxidation of isobutene

The same reactor as used for ammoxidation of propylene was used, and feed gas of the following composition was introduced:

$O_2$ (air)/isobutene = 3.0 (mol/mol)

$NH_3$/isobutene = 1.3 (mol/mol)

The reaction was carried out at atmospheric pressure.

(3) Ammoxidation of t-butanol

The same reactor as used for ammoxidation of propylene was used, and feed gas of the following composition was introduced:

$O_2$ (air)/t-butanol = 3.0 (mol/mol)

$NH_3$/t-butanol = 1.3 (mol/mol)

The reaction was carried out at atmospheric pressure.

(4) Ammoxidation of methanol

The same reactor as used for ammoxidation of propylene was used, and feed gas of the following composition was introduced:

$O_2$ (air)/methanol = 2.3 (mol/mol)

$NH_3$/methanol = 1.2 (mol/mol) (4.0 vol% methanol)

The reaction was carried out at atmospheric pressure.

EXAMPLE 1

The ammoxidation of propylene was carried out using a fluidized-bed catalyst (weight mean diameter (median) 54 μm) having an empirical formula of $W_{0.25}Te_{1.0}Fe_{10}Sb_{25}O_{67.8}(SiO_2)_{30}$.

When the activity of this catalyst was tested according to test condition (1) set forth above, the yield of acrylonitrile was 80% of the beginning, but later declined to 75%.

To this deactivated catalyst was added ammonium paramolybdate. The thus-prepared ammonium paramolybdate powder was added in a sufficient amount to increase the apparent content of Mo as to 0.05wt%, based on the catalyst. The reaction was continued under the stated conditions.

Three hours later, the yield of acrylonitrile was restored to 79%.

COMPARATIVE EXAMPLE 1

To the deactivated catalyst of Example 1 was added the ammonium paramolybdate powder of Example 1, in an amount sufficient to increase the apparent content of Mo by 3.0%, and the reaction was continued as set forth above. Three hours later, the yield of acrylonitrile was 74%.

Although the reaction rate increased and the yields of carbon dioxide and hydrocyanic acid increased, the yield of acrylonitrile did not recover.

COMPARATIVE EXAMPLE 2

To the deactivated catalyst of Example 1 was added the ammonium paramolybdate powder of that Example, in a sufficient amount to increase the apparent content of Mo by 0.005%, and the reaction was continued as above. Three hours later, the yield of acrylonitrile remained only 75%.

No effect was observed from adding the molybdenum component.

EXAMPLE 2

The ammoxidation of propylene was carried out in a pilot plant using a fluidized-bed catalyst (weight mean diameter (median) 58 μm) having an empirical formula of $Mo_{0.25}Te_{1.0}Cu_{0.5}Fe_{10}SB_{25}O_{68.3}(SiO_2)_{60}$.

When the activity of this catalyst was tested by reacting according to test condition (1) set forth above, the yield of acrylonitrile was 77%. After reaction for 500 hours, the yield of acrylonitrile was 75%.

The composition of the deactivated catalyst was determined by X-ray fluorescence analysis and no loss of molybdenum was detected.

To this deactivated catalyst was added molybdenum trioxide powder in an amount sufficient to increase the apparent content of Mo by 0.1%. The reaction was continued under the stated conditions, and three hours later, the yield of acrylonitrile increased to 76%.

EXAMPLE 3

The ammoxidation of propylene was carried out using a fluidized-bed catalyst (weight mean diameter (median) 59 μm) having an empirical formula of $W_{0.5}Te_{1.0}Cu_{3.0}Fe_{10}Sb_{25}O_{71.5}(SiO_2)_{60}$.

The activity of this catalyst was determined by charging a reactor with the catalyst and reacting according to test condition (1) set forth above. The initial yield of acrylonitrile was 78%. In the course of the reaction, the molar ratio of air:propylene was temporarily decreased but it was then restored to the initial gas composition. The yield of acrylonitrile became 76%.

To the thus-depleted catalyst was added ammonium phosphomolybdate powder. The ammonium phosphomolybdate was added in an amount sufficient to increase the apparent content of Mo to 0.15%, based on the catalyst. The reaction was continued under the conditions specified in (1) above, and five hours later the yield of acrylonitrile was restored to 78%.

EXAMPLE 4

The ammoxidation of propylene was carried out using a fluidized-bed catalyst (weight mean diameter (median) 56 μm) having an empirical formula of $V_{0.1}Mo_{0.5}W_{0.3}Te_{2.3}Cu_{3.0}Fe_{10}Sb_{20}O_{65.3}(SiO_2)_{100}$.

The activity of this catalyst was determined by charging a reactor with the catalyst, and reacting according to test condition (1) set forth above. The initial yield of acrylonitrile was 82%. In the course of the reaction, the partial pressure of oxygen declined at the outlet of the reactor due to the decrease in flow rate of the feed gas. The flow rate was then restored to the prescribed conditions. The yield of acrylonitrile was 79%.

The composition of the deactivated catalyst was determined by X-ray fluorescence analysis and no loss of molybdenum was detected.

To this depleted catalyst was added molybdic acid powder in a sufficient amount to increase the apparent content of Mo by 0.3%. The reaction was resumed under the stated conditions, and three hours later, the yield of acrylonitrile increased to 81%.

EXAMPLE 5

The ammoxidation of propylene was carried out in a reactor using a fluidized-bed catalyst (weight mean diameter (median) 67 μm) having an empirical formula of $W_{0.5}Te_{1.0}Al_2Fe_{10}Sb_{25}O_{71.5}(SiO_2)_{30}$.

This catalyst was charged in the reactor, and the catalyst's activity was tested by reaction according to test condition (1) set forth above. The yield of acrylonitrile was 77%. The reaction temperature was raised by 20° C., and the content of oxygen became almost zero at the outlet of the reactor. The reaction temperature was restored and the reaction was continued for 2 hours. The yield of acrylonitrile declined to 73%.

To this deteriorated catalyst was added molybdenum trioxide powder in a sufficient amount to increase the apparent content of Mo to 0.1%, based on the catalyst. The reaction was continued under test condition (1), and five hours later, the yield of acrylonitrile increased to 76%.

EXAMPLE 6

The ammoxidation of isobutene was carried out in a reactor using a fluidized-bed catalyst (weight mean diameter (median) 58 μm) having an empirical formula of $V_{0.1}W_{0.6}Te_{1.5}Zn_2Fe_{10}Sb_{20}O_{62.1}(SiO_2)_{60}$.

When the activity of this catalyst was tested by charging the reactor with catalyst and reacting according to test condition (2) set forth above, the yield of methacrylonitrile was 68%. After 50 hours of reaction, the yield of methacrylonitrile declined to 66%.

To this deteriorated catalyst was added molybdenum trioxide powder. The amount was sufficient to increase the apparent content of Mo to 0.5%, based on the catalyst. The reaction was continued under stated conditions and three hours later the yield of methacrylonitrile was restored to 69%.

EXAMPLE 7

The ammoxidation of t-butanol was carried out in a reactor using a fluidized-bed catalyst (weight mean diameter (median) 55 μm) having an empirical formula of $Mo_1Te_2Cu_4Fe_{10}Sb_{23}O_{72}(SiO_2)_{60}$.

When the activity of this catalyst was tested by charging the reactor with catalyst and reacting according to test condition (3) set forth above, the yield of methacrylonitrile was 70%. After 25 hours of reaction, the yield of methacrylonitrile declined to 65%.

The composition of the deactivated catalyst was determined by X-ray fluorescence analysis and no loss of molybdenum was detected.

To this deteriorated catalyst was added molybdic acid powder in an amount sufficient to increase the apparent content of Mo by 0.8%. The reaction was continued under the stated conditions and three hours later the yield of methacrylonitrile was restored to 72%.

EXAMPLE 8

The ammoxidation of methanol was carried out in a reactor using a fluidized-bed catalyst (weight mean diameter (median) 35 μm) having an empirical formula of $W_{0.25}Te_{1.0}Fe_{10}Sb_{25}O_{67.8}(SiO_2)_{60}$.

The activity of this catalyst was tested by charging the reactor with catalyst, and reacting according to test condition (4) set forth above. The yield of hydrogen cyanide was 85%. After 30 hours of reaction, the yield of hydrogen cyanide was 80%.

To this deactivated catalyst was added molybdenum trioxide powder prepared as in Example 6 above. The amount which was added to the reactor was sufficient to increase the apparent content of Mo to 1.5%, based on the catalyst.

The reaction was continued under the stated conditions, and three hours later, the yield of hydrogen cyanide was increased to 86%.

EXAMPLE 9

To the deactivated catalyst of Example 2 was added metallic molybdenum powder. The metallic molybdenum powder was added to the reactor in an amount sufficient to increase the apparent content of Mo by 0.3%. The reaction was continued under the indicated conditions, and three hours later, the yield of acrylonitrile was increased to 78.5%.

The above Examples and Comparative Examples are summarized in the following tables.

TABLE

| | | Solid Molybdenum component | | | Results of activity tests | | | |
|---|---|---|---|---|---|---|---|---|
| | Catalyst composition (atomic ratio) | Apparent increase of Mo (%) | Molybdenum compound added | Mean* particle diameter (μm) | Reaction temperature (°C.) | Contact time (sec) | | |
| Example 1 | $W_{0.25}Te_{1.0}Fe_{10}$—$Sb_{25}O_{67.8}(SiO_2)_{30}$ | | | | | | Yield of acrylonitrile (%) | Conversion of propylene (%) |
| | Before deactivation | | | | 460 | 6 | 80 | 99 |
| | After deactivation | | | | 460 | 6 | 75 | 94 |
| | After regeneration | 0.05 | Ammonium paramolybdate | 12 | 460 | 6 | 79 | 98 |
| Comparative Example 1 | After addition of Mo component | 3.0 | Ammonium paramolybdate | 12 | 460 | 6 | 74 | 98 |
| Comparative Example 2 | After addition of Mo component | 0.005 | Ammonium paramolybdate | 12 | 460 | 6 | 75 | 94 |
| Example 2 | $Mo_{0.25}Te_{1.0}Cu_{0.5}Fe_{10}$—$Sb_{25}O_{68.3}(SiO_2)_{60}$ | | | | | | | |
| | Before deactivation | | | | 460 | 6 | 77 | 99 |
| | After deactivation | | | | 460 | 6 | 75 | 97 |
| | After regeneration | 0.1 | Molybdenum trioxide | 3 | 460 | 6 | 76 | 99 |
| Example 3 | $W_{0.5}Te_{1.0}Cu_{3.0}Fe_{10}$—$Sb_{25}O_{71.5}(SiO_2)_{60}$ | | | | | | | |
| | Before deactivation | | | | 460 | 5 | 78 | 98 |
| | After deactivation | | | | 460 | 5 | 76 | 95 |
| | After regeneration | 0.15 | Ammonium phosphomolybdate | 5 | 460 | 5 | 78 | 99 |
| Example 4 | $V_{0.1}Mo_{0.5}W_{0.3}Te_{2.3}$—$Cu_{3.0}Fe_{10}Sb_{20}O_{65.3}$—$(SiO_2)_{100}$ | | | | | | | |
| | Before deactivation | | | | 440 | 5 | 82 | 98 |
| | After deactivation | | | | 440 | 5 | 79 | 97 |
| | After regeneration | 0.3 | Molybdic acid | 8 | 440 | 5 | 81 | 99 |
| Example 5 | $W_{0.5}Te_{1.0}Al_2Fe_{10}$— | | | | | | | |

TABLE-continued

| | Catalyst composition (atomic ratio) | Apparent increase of Mo (%) | Molybdenum compound added | Mean* particle diameter (μm) | Reaction temperature (°C.) | Contact time (sec) | Results of activity tests | |
|---|---|---|---|---|---|---|---|---|
| | $Sb_{25}O_{71.5}(SiO_2)_{30}$ | | | | | | | |
| | Before deactivation | | | | 450 | 3.5 | 77 | 99 |
| | After deactivation | | | | 450 | 3.5 | 73 | 95 |
| | After regeneration | 0.1 | Molybdenum trioxide | 7 | 450 | 3.5 | 76 | 98 |
| Example 6 | $V_{0.1}W_{0.6}Te_{1.5}Zn_2Fe_{10}$—$Sb_{20}O_{62.1}(SiO_2)_{60}$ | | | | | | Yield of methacrylonitrile (%) | Conversion of iso-butene (%) |
| | Before deactivation | | | | 420 | 2.0 | 68 | 98 |
| | After deactivation | | | | 420 | 2.0 | 66 | 96 |
| | After regeneration | 0.5 | Molybdenum trioxide | 1 | 420 | 2.0 | 69 | 98 |
| Example 7 | $Mo_1Te_2Cu_4Fe_{10}Sb_{23}$—$O_{72}(SiO_2)_{60}$ | | | | | | | Conversion of t-butanol (%) |
| | Before deactivation | | | | 410 | 2.5 | 70 | 96 |
| | After deactivation | | | | 410 | 2.5 | 65 | 92 |
| | After regeneration | 0.8 | Molybdic acid | 10 | 410 | 2.5 | 72 | 98 |
| Example 8 | $W_{0.25}Te_{1.0}Fe_{10}Sb_{25}$—$O_{67.8}(SiO_2)_{60}$ | | | | | | Yield of hydrogen cyanide (%) | Conversion of methanol (%) |
| | Before deactivation | | | | 430 | 1.5 | 85 | 98 |
| | After deactivation | | | | 430 | 1.5 | 80 | 95 |
| | After regeneration | 1.5 | Molybdenum trioxide | 2 | 430 | 1.5 | 86 | 99 |
| Example 9 | $Mo_{0.25}Te_{1.0}Cu_{0.5}Fe_{10}$—$Sb_{25}O_{68.3}(SiO_2)_{60}$ | | | | | | Yield of acrylonitrile (%) | Conversion of propylene (%) |
| | Before deactivation | | | | 460 | 6 | 77 | 99 |
| | After deactivation | | | | 460 | 6 | 75 | 97 |
| | After regeneration | 0.3 | Metallic molybdenum | 1.5 | 460 | 6 | 78.5 | 99 |

Note:
*Weight mean diameter (median) (μm)

While the invention has been described in detail and with reference to specific embodiments thereof, it will be apparent to one skilled in the art that various changes and modifications can be made therein without departing from the spirit and scope thereof.

What is claimed is:

1. A process for regenerating an iron-antimony metallic oxide catalyst containing as essential components (I) Fe, (II) Sb, (III) at least one element selected from the group consisting of V, Mo, and W and (IV) Te, which has become deactivated after being used for the production of nitriles through ammoxidation or hydrocarbons or alcohols in fluidized-bed reactors, said process comprising adding to said catalyst dry solid molybdenum or a dry solid molybdenum compound which is volatile or capable of forming a volatile compound under reaction conditions in such an amount that the apparent content of molybdenum in the catalyst increases by 0.1 to 2 wt%, and performing the ammoxidation in the presence of the mixture of said deactivated catalyst and said solid molybdenum or molybdenum compound, wherein said molybdenum or solid molybdenum compound is not supported on an inert carrier, wherein said solid molybdenum compound is selected from the group consisting of molybdenum dioxide, molybdenum trioxide, molybdic acid, ammonium molybdate, ammonium paramolybdate, phosphomolybdic acid, ammonium phosphomolybdate, heteropoly acids or molybdenum and salts thereof, molybdenum disulfide, molybdenum trisulfide, molybdenum dichloride, molybdenum trichloride, molybdenum pentachloride, and organic molybdenum compounds which are solid at ordinary temperature, wherein the catalyst is in the form of particles having a diameter of 1 to 500 microns, the solid dry molybdenum or solid dry molybdenum compound is in the form of particles having a diameter of 0.1 to 5,000 microns, and the catalyst is mixed with the solid dry molybdenum or solid dry molybdenum compound when the catalyst is in a fluidized state.

2. The process according to claim 1, wherein the iron-antimony metallic oxide catalyst is a metal oxide catalyst containing, in addition to said components (I) to (IV), (V) at least one element selected from the group consisting of lithium, sodium, potassium, rubidium, cesium, beryllium, magnesium, calcium, strontium, barium, yttrium, lanthanum, cerium, thorium, uranium, titanium, zirconium, hafnium, niobium, tatalum, chromium, manganese, rhenium, ruthenium, osmium, cobalt, rhodium, iridium, nickel, palladium, platinum, copper, silver, zinc, cadmium, boron, aluminum, gallium, indium, thallium, germanium, tin, lead, phosphorus, arsenic, bismuth, sulfur, and selenium.

3. The process of claim 1 wherein the catalyst prior to deactivation has the empirical formula:

$Fe_{10}Sb_aMe_bTe_cQ_dO_3(SiO_2)_f$ where,

Me is at least one element selected from the group consisting of V, Mo, and W;

Q is at least one element selected from the group consisting of Li, Na, K, Rb, Cs, Be, Mg, Ca, Sr, Ba, Y, La, Ce, Th, U, Ti, Zr, Hf, Nb, Ta, Cr, Mn, Re, Ru, Os, Co, Rh, Ir, Ni, Pd, Pt, Cu, Ag, Zn, Cd, B, Al, Ga, In, Tl, Ge, Sn, Pb, P, As, Bi, S, and Se;

a is 2 to 100, b is 0.01 to 20, c is 0.05 to 10, d is 0 to 20, e is the number of oxygen atoms corresponding to the oxides formed by the above components, and f is 0 to 200.

4. The process according to claim 1 wherein the solid molybdenum compound is at least one member of the group consisting of, molybdenum trioxide, molybdic acid, ammonium molybdate, ammonium paramolybdate, or ammonium phosphomolybdate.

5. The process according to claim 1 wherein the catalyst is in the form of particles having a weight mean diameter (median) of 20 to 120 microns.

6. The process according to claim 1 wherein the solid molybdenum or molybdenum is in the form of particles having a weight mean diameter (median) of 0.5 to 500 microns.

7. The process according to claim 1 wherein the catalyst is in the form of particles having a weight mean diameter (median) of 20 to 120 microns and the solid molybdenum or molybdenum compound is in the form of particles having a weight means diameter (median) of 0.5 to 500 microns, and the catalyst is mixed with the solid molybdenum or molybdenum compound when the catalyst is in a fluidized state.

8. The process of claim 3 wherein a is 10 to 40, b is 0.1 to 5, c is 0.25 to 5, d is 0.5 to 6, and f is 25 to 150.

9. The process according to claim 1, wherein said organic compounds are propylene, isobutene, methanol or tert-butanol.

* * * * *